(12) United States Patent
Azmoodeh et al.

(10) Patent No.: US 11,900,418 B2
(45) Date of Patent: Feb. 13, 2024

(54) MUTABLE GEO-FENCING SYSTEM

(71) Applicant: Snap Inc., Santa Monica, CA (US)

(72) Inventors: Farnaz Azmoodeh, Venice, CA (US); Peter Sellis, Venice, CA (US); Jinlin Yang, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/474,821

(22) Filed: Mar. 30, 2017

(65) Prior Publication Data

US 2017/0287006 A1     Oct. 5, 2017

Related U.S. Application Data

(60) Provisional application No. 62/318,049, filed on Apr. 4, 2016.

(51) Int. Cl.
  *G06Q 30/0251* (2023.01)
  *H04W 4/24* (2018.01)
  (Continued)

(52) U.S. Cl.
  CPC ..... *G06Q 30/0261* (2013.01); *G06Q 30/0272* (2013.01); *H04M 15/58* (2013.01);
  (Continued)

(58) Field of Classification Search
  CPC .................................. G06Q 30/0207–30/0277
  (Continued)

(56) References Cited

U.S. PATENT DOCUMENTS 5,999,932 A   12/1999  Paul
6,038,295 A    3/2000  Mattes
(Continued)

FOREIGN PATENT DOCUMENTS

CA       2887596 A1    7/2015
CN      103947229      7/2014
(Continued)

OTHER PUBLICATIONS

WIPO; International Preliminary Report; WO201776739; dated Oct. 9, 2018 (Year: 2018).*

(Continued)

*Primary Examiner* — Tarek Elchanti
(74) *Attorney, Agent, or Firm* — Schwegman Lundberg & Woessner, P.A.

(57) ABSTRACT

In various embodiments, boundaries of geo-fences can be made mutable based on principles described herein. The term "mutable" refers to the ability of a thing (in this case, the boundary of a geo-fence) to change and adjust. In a typical embodiment, a mutable geo-fence system is configured to generate and monitor a geo-fence that encompasses a region, in order to dynamically vary the boundary of the geo-fence based on a number of boundary variables. The term "geo-fence" as used herein describes a virtual perimeter (e.g., a boundary) for a real-world geographic area. A geo-fence could be a radius around a point (e.g., a store), or a set of predefined boundaries. Boundary variables, as used herein, refers to a set of variables utilized by the mutable geo-fence system in determining a location of the boundary of the geo-fence.

20 Claims, 10 Drawing Sheets

(51) Int. Cl.
*H04M 15/00* (2006.01)
*G06Q 30/0272* (2023.01)
*H04W 4/021* (2018.01)

(52) U.S. Cl.
CPC ....... *H04M 15/8033* (2013.01); *H04W 4/022* (2013.01); *H04W 4/24* (2013.01)

(58) Field of Classification Search
USPC ...................................... 705/14, 319, 14.58
See application file for complete search history.

(56) References Cited

U.S. PATENT DOCUMENTS

| | | | |
|---|---|---|---|
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,484,196 B1 | 11/2002 | Maurille | |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,203,380 B2 | 4/2007 | Chiu et al. | |
| 7,356,564 B2 | 4/2008 | Hartselle et al. | |
| 7,411,493 B2 | 8/2008 | Smith | |
| 7,519,670 B2 | 4/2009 | Hagale et al. | |
| 7,535,890 B2 | 5/2009 | Rojas | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,199,747 B2 | 6/2012 | Rojas et al. | |
| 8,229,473 B1 | 7/2012 | De La Rue | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,332,475 B2 | 12/2012 | Rosen et al. | |
| 8,379,130 B2 | 2/2013 | Forutanpour et al. | |
| 8,405,773 B2 | 3/2013 | Hayashi et al. | |
| 8,418,067 B2 | 4/2013 | Cheng et al. | |
| 8,471,914 B2 | 6/2013 | Sakiyama et al. | |
| 8,560,612 B2 | 10/2013 | Kilmer et al. | |
| 8,688,519 B1 * | 4/2014 | Lin .................... | G06Q 30/0256 |
| | | | 705/14.54 |
| 8,718,333 B2 | 5/2014 | Wolf et al. | |
| 8,724,622 B2 | 5/2014 | Rojas | |
| 8,744,523 B2 | 6/2014 | Fan et al. | |
| 8,775,972 B2 | 7/2014 | Spiegel | |
| 8,788,680 B1 | 7/2014 | Naik | |
| 8,797,415 B2 | 8/2014 | Arnold | |
| 8,856,349 B2 | 10/2014 | Jain et al. | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,635,500 B1 * | 4/2017 | Becker .................... | G01S 19/42 |
| 9,641,972 B1 * | 5/2017 | Hughes ................ | H04W 4/021 |
| 11,216,869 B2 * | 1/2022 | Allen .................... | G06Q 30/08 |
| 2002/0047868 A1 | 4/2002 | Miyazawa | |
| 2002/0122659 A1 | 9/2002 | Mcgrath et al. | |
| 2002/0144154 A1 | 10/2002 | Tomkow | |
| 2003/0016247 A1 | 1/2003 | Lai et al. | |
| 2003/0052925 A1 | 3/2003 | Daimon et al. | |
| 2003/0126215 A1 | 7/2003 | Udell | |
| 2003/0164856 A1 | 9/2003 | Prager et al. | |
| 2004/0027371 A1 | 2/2004 | Jaeger | |
| 2004/0111467 A1 | 6/2004 | Willis | |
| 2004/0203959 A1 | 10/2004 | Coombes | |
| 2004/0243531 A1 | 12/2004 | Dean | |
| 2005/0078804 A1 | 4/2005 | Yomoda | |
| 2005/0097176 A1 | 5/2005 | Schatz et al. | |
| 2005/0104976 A1 | 5/2005 | Currans | |
| 2005/0114783 A1 | 5/2005 | Szeto | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |
| 2006/0026067 A1 | 2/2006 | Nicholas et al. | |
| 2006/0114338 A1 | 6/2006 | Rothschild | |
| 2006/0270419 A1 | 11/2006 | Crowley et al. | |
| 2007/0040931 A1 | 2/2007 | Nishizawa | |
| 2007/0073823 A1 | 3/2007 | Cohen et al. | |
| 2007/0082707 A1 | 4/2007 | Flynt et al. | |
| 2007/0192128 A1 | 8/2007 | Celestini | |
| 2007/0214216 A1 | 9/2007 | Carrer et al. | |
| 2007/0233801 A1 | 10/2007 | Eren et al. | |
| 2007/0243887 A1 | 10/2007 | Bandhole et al. | |
| 2007/0255456 A1 | 11/2007 | Funayama | |
| 2008/0025701 A1 | 1/2008 | Ikeda | |
| 2008/0033930 A1 | 2/2008 | Warren | |
| 2008/0104503 A1 | 5/2008 | Beall et al. | |
| 2008/0207176 A1 | 8/2008 | Brackbill et al. | |
| 2008/0222545 A1 | 9/2008 | Lemay | |
| 2008/0256446 A1 | 10/2008 | Yamamoto | |
| 2008/0266421 A1 | 10/2008 | Takahata et al. | |
| 2008/0270938 A1 | 10/2008 | Carlson | |
| 2008/0313346 A1 | 12/2008 | Kujawa et al. | |
| 2009/0006565 A1 | 1/2009 | Velusamy et al. | |
| 2009/0015703 A1 | 1/2009 | Kim et al. | |
| 2009/0024956 A1 | 1/2009 | Kobayashi | |
| 2009/0040324 A1 | 2/2009 | Nonaka | |
| 2009/0042588 A1 | 2/2009 | Lottin et al. | |
| 2009/0058822 A1 | 3/2009 | Chaudhri | |
| 2009/0079846 A1 | 3/2009 | Chou | |
| 2009/0132453 A1 | 5/2009 | Hangartner et al. | |
| 2009/0132665 A1 | 5/2009 | Thomsen et al. | |
| 2009/0153492 A1 | 6/2009 | Popp | |
| 2009/0160970 A1 | 6/2009 | Fredlund et al. | |
| 2009/0265647 A1 | 10/2009 | Martin et al. | |
| 2009/0292608 A1 | 11/2009 | Polachek | |
| 2010/0082693 A1 | 4/2010 | Hugg et al. | |
| 2010/0131880 A1 | 5/2010 | Lee et al. | |
| 2010/0131895 A1 | 5/2010 | Wohlert | |
| 2010/0159944 A1 | 6/2010 | Pascal et al. | |
| 2010/0161831 A1 | 6/2010 | Haas et al. | |
| 2010/0185665 A1 | 7/2010 | Horn et al. | |
| 2010/0214436 A1 | 8/2010 | Kim et al. | |
| 2010/0223128 A1 | 9/2010 | Dukellis et al. | |
| 2010/0223343 A1 | 9/2010 | Bosan et al. | |
| 2010/0257196 A1 | 10/2010 | Waters et al. | |
| 2010/0281045 A1 | 11/2010 | Dean | |
| 2010/0306669 A1 | 12/2010 | Della Pasqua | |
| 2011/0004071 A1 | 1/2011 | Faiola et al. | |
| 2011/0040783 A1 | 2/2011 | Uemichi et al. | |
| 2011/0040804 A1 | 2/2011 | Peirce et al. | |
| 2011/0050909 A1 | 3/2011 | Ellenby et al. | |
| 2011/0050915 A1 | 3/2011 | Wang et al. | |
| 2011/0102630 A1 | 6/2011 | Rukes | |
| 2011/0145564 A1 | 6/2011 | Moshir et al. | |
| 2011/0197194 A1 | 8/2011 | D'Angelo et al. | |
| 2011/0202598 A1 | 8/2011 | Evans et al. | |
| 2011/0202968 A1 | 8/2011 | Nurmi | |
| 2011/0211534 A1 | 9/2011 | Schmidt et al. | |
| 2011/0213845 A1 | 9/2011 | Logan et al. | |
| 2011/0273575 A1 | 11/2011 | Lee | |
| 2011/0283188 A1 | 11/2011 | Farrenkopf | |
| 2011/0320373 A1 | 12/2011 | Lee et al. | |

(56) References Cited

U.S. PATENT DOCUMENTS

| | | |
|---|---|---|
| 2012/0150978 A1 | 1/2012 | Monaco |
| 2012/0028659 A1 | 2/2012 | Whitney et al. |
| 2012/0036015 A1 | 2/2012 | Sheikh |
| 2012/0062805 A1 | 3/2012 | Candelore |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0302259 A1 | 11/2012 | Busch |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0323933 A1 | 12/2012 | He et al. |
| 2013/0023284 A1* | 1/2013 | Stanger ............... G06Q 30/0207 707/825 |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0311255 A1 | 11/2013 | Cummins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0164118 A1 | 6/2014 | Polachi |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0317302 A1 | 10/2014 | Naik |
| 2014/0325383 A1 | 10/2014 | Brown et al. |
| 2015/0046278 A1 | 2/2015 | Pei et al. |
| 2015/0116529 A1 | 4/2015 | Wu et al. |
| 2015/0172534 A1 | 6/2015 | Miyakawa et al. |
| 2015/0222814 A1 | 8/2015 | Li et al. |
| 2015/0287072 A1* | 10/2015 | Golden ............... G06Q 30/0275 705/14.43 |
| 2015/0341747 A1* | 11/2015 | Barrand ............... G06Q 30/0201 455/405 |
| 2016/0006927 A1 | 1/2016 | Sehn |
| 2016/0085863 A1 | 3/2016 | Allen et al. |
| 2016/0321765 A1* | 11/2016 | Malone ................. G06Q 30/02 |
| 2022/0237691 A1 | 7/2022 | Allen et al. |

FOREIGN PATENT DOCUMENTS

| | | |
|---|---|---|
| CN | 104969219 | 10/2015 |
| CN | 109247071 A | 1/2019 |
| CN | 113825091 A | 12/2021 |
| KR | 20150091381 | 8/2015 |
| KR | 102337568 B1 | 12/2021 |
| KR | 102466368 | 11/2022 |
| WO | WO-2011119407 A1 | 9/2011 |
| WO | WO-2012000107 A1 | 1/2012 |
| WO | 2015085176 | 6/2015 |
| WO | 2017176739 | 10/2017 |

OTHER PUBLICATIONS

WIPO; Search Strategy; WO201776739;dated Oct. 12, 2017 (Year: 2017).*

Sandro Rodriguez Garzon, Geofencing 2.0: Taking Location-based Notifications to the Next Level, 2012 (Year: 2012).*

"U.S. Appl. No. 14/494,226, Examiner Interview Summary dated Dec. 20, 2017", 2 pgs.

"U.S. Appl. No. 14/494,226, Response filed Jan. 8, 2018 to Non Final Office Action dated Sep. 7, 2017", 15 pgs.

"U.S. Appl. No. 14/494,226, Appeal Brief filed Mar. 1, 2019 in response to Final Office Action dated Jun. 1, 2018", 29 pgs.

"U.S. Appl. No. 14/494,226, Final Office Action dated Jun. 1, 2018", 33 pgs.

U.S. Appl. No. 14/494,226, filed Sep. 23, 2014, User Interface to Augment an Image Using Geolocation.

"U.S. Appl. No. 14/494,226, Non Final Office Action dated Sep. 7, 2017", 36 pgs.

"International Application Serial No. PCT US2017 025925, International Preliminary Report on Patentability dated Oct. 18, 2018", 6 pgs.

"U.S. Appl. No. 14/494,226, Appeal Decision mailed Feb. 26, 2021", 8 pgs.

"Chinese Application Serial No. 201780034240.5, Office Action dated Feb. 3, 2021", w/ English Translation, 13 pgs.

"Korean Application Serial No. 10-2021-7004232, Notice of Preliminary Rejection dated Feb. 23, 2021", w/ English translation, 12 pgs.

"U.S. Appl. No. 14/494,226, Corrected Notice of Allowability dated Sep. 28, 2021", 2 pgs.

"U.S. Appl. No. 14/494,226, Notice of Allowance dated Jun. 9, 2021", 7 pgs.

"U.S. Appl. No. 14/494,226, Notice of Allowance dated Aug. 25, 2021", 5 pgs.

"Chinese Application Serial No. 201780034240.5, Response filed Apr. 14, 2021 to Office Action dated Feb. 3, 2021", w/ English Claims, 13 pgs.

(56) References Cited

OTHER PUBLICATIONS

"Chinese Application Serial No. 201780034240.5, Response filed Jul. 8, 2021 to Office Action", w/ English Claims, 11 pgs.

"Korean Application Serial No. 10-2021-7004232, Response filed May 24, 2021 to Notice of Preliminary Rejection dated Feb. 23, 2021", w/ English Claims, 22 pgs.

"Chinese Application Serial No. 201780034240.5, Response filed Oct. 16, 2020 to Office Action dated Jun. 3, 2020", w/ English Translation, 8 pgs.

"U.S. Appl. No. 14/494,226, Examiner Interview Summary dated Oct. 27, 2016", 3 pgs.

"U.S. Appl. No. 14/494,226, Final Office Action dated Mar. 7, 2017", 34 pgs.

"U.S. Appl. No. 14/494,226, Non Final Office Action dated Sep. 12, 2016", 32 pgs.

"U.S. Appl. No. 14/494,226, Response filed Jul. 7, 2017 to Final Office Action dated Mar. 7, 2017", 13 pgs.

"U.S. Appl. No. 14/494,226, Response filed Dec. 12, 2016 to Non Final Office Action dated Sep. 12, 2016", 16 pgs.

"How Snaps Are Stored And Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.

"International Application Serial No. PCT/US2014/040346, International Search Report dated Mar. 23, 2015", 2 pgs.

"International Application Serial No. PCT/US2014/040346, Written Opinion dated Mar. 23, 2015", 6 pgs.

"International Application Serial No. PCT/US2017/025925, International Search Report dated Jun. 28, 2017", 2 pgs.

"International Application Serial No. PCT/US2017/025925, Written Opinion dated Jun. 28, 2017", 4 pgs.

"IVisit Mobile Getting Started", iVisit, (Dec. 4, 2013), 1-16.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Melanson, Mike, "This text message will self destruct in 60 seconds", readwrite.com, [Online]. Retrieved from the Internet: <http://readwrite.com/2011/02/11/this_text_message_will_self_destruct_in_60_seconds>, (Feb. 18, 2015).

Sawers, Paul, "Snapchat for iOS Lets You Send Photos to Friends and Set How long They're Visible For", [Online]. Retrieved from the Internet:. <http:/ /thenextweb.com/apps/2012/05/07/Snapchat-for-ios-lets-you-send-photos-to-friends-and-set-how-long-theyre-visiblefor/#! xCjrp>,, (May 7, 2012), 1-5.

Shein, Esther, "Ephemeral Data", Communications of the ACM vol. 56 | No. 9, (Sep. 2013), 20-22.

"Korean Application Serial No. 10-2018-7031943, Notice of Preliminary Rejection dated Feb. 11, 2020", w/ English Translation, 9 pgs.

"Korean Application Serial No. 10-2018-7031943, Response filed Jun. 18, 2020 to Notice of Preliminary Rejection dated Feb. 11, 2020", w/ English Claims, 20 pgs.

"Chinese Application Serial No. 201780034240.5, Office Action dated Jun. 3, 2020", w/ English Translation, 13 pgs.

"U.S. Appl. No. 14/494,226, Corrected Notice of Allowability dated Dec. 6, 2021", 2 pgs.

"Korean Application Serial No. 10-2021-7039934, Notice of Preliminary Rejection dated Jan. 13, 2022", w/ English Translation, 9 pgs.

"U.S. Appl. No. 17/567,624, Preliminary Amendment filed Sep. 20, 2022", 7 pgs.

"Korean Application Serial No. 10-2022-7039119, Notice of Preliminary Rejection dated Dec. 7, 2022", w English translation, 13 pgs.

\* cited by examiner

800

```
┌─────────────────────────────────────────────────────────────────┐
│ CALCULATE A PREDICTED USAGE METRIC OF THE GEO-FENCE, BASED ON AT LEAST │
│        THE USAGE METRIC OF THE CELL AND A SIZE OF THE GEO-FENCE │
│                              802                                │
└─────────────────────────────────────────────────────────────────┘
                                 │
                                 ▼
┌─────────────────────────────────────────────────────────────────┐
│   RECEIVE CAMPAIGN INFORMATION THAT INCLUDES A DURATION AND MEDIA │
│                           CONTENT                               │
│                              804                                │
└─────────────────────────────────────────────────────────────────┘
                                 │
                                 ▼
┌─────────────────────────────────────────────────────────────────┐
│  CALCULATE A VALUE OF THE GEO-FENCE BASED ON THE CAMPAIGN INFORMATION │
│               AND THE PREDICTED USAGE METRIC                    │
│                              806                                │
└─────────────────────────────────────────────────────────────────┘
                                 │
                                 ▼
┌─────────────────────────────────────────────────────────────────┐
│               ASSIGN THE VALUE TO THE GEO-FENCE                 │
│                              808                                │
└─────────────────────────────────────────────────────────────────┘
```

*FIG. 8*

MUTABLE GEO-FENCING SYSTEM

RELATED APPLICATIONS

This application claims benefit of priority from U.S. Provisional Patent Application Ser. No. 62/318,049, filed on Apr. 4, 2016, which is hereby incorporated by reference in its entirety.

TECHNICAL FIELD

Embodiments of the present disclosure relate generally to mobile computing technology and, more particularly, but not by way of limitation, to mutable geo-fencing system.

BACKGROUND

Geo-fencing is the practice of using a global positioning system (GPS) or radio frequency identification (RFID) to define a geographic boundary that may encompass a region. Once the virtual boundary is established, an administrator can set triggers to transmit content when devices enter (or exit) the specified region. Advertisers often use geo-fences to distribute marketing campaigns to devices that may enter a particular region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 is a flow diagram illustrating an example method for calculating a value of a geo-fenced area, according to example embodiments.

DETAILED DESCRIPTION

Figure 1:
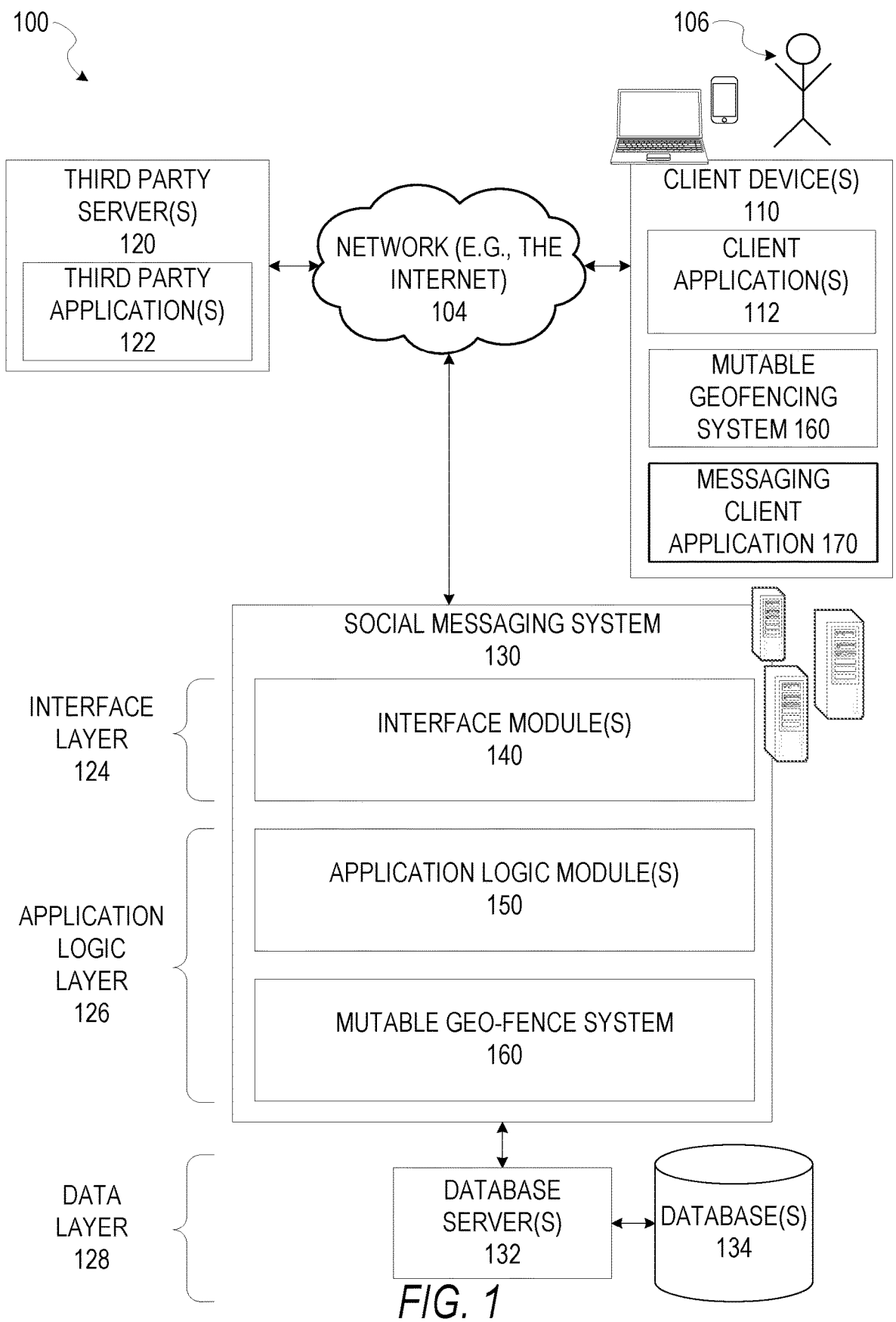
FIG. 1 is a block diagram showing an example messaging system for exchanging data (e.g., messages and associated content) over a network.

In various embodiments, boundaries of geo-fences can be made mutable based on principles described herein. The term "mutable" refers to the ability of a thing (in this case, the boundary of a geo-fence) to change and adjust. In a typical embodiment, a mutable geo-fence system is configured to generate and monitor a geo-fence that encompasses a region, in order to dynamically vary the boundary of the geo-fence based on a number of boundary variables. The term "geo-fence" as used herein describes a virtual perimeter (e.g., a boundary) for a real-world geographic area. A geo-fence could be a radius around a point (e.g., a store), or a set of otherwise-defined boundaries. The real-world geographic area within a given geo-fence will be referenced herein as a geo-fenced area. Boundary variables, as used herein, refers to a set of variables used by the mutable geo-fence system in determining a location of the boundary of the geo-fence.

Geo-fences are often used by advertisers to deliver or enable content to devices that cross over the boundary of the geo-fence, into the geo-fenced area. The content may include a campaign managed by an advertiser to deliver coupons or digital media content (e.g., images, videos, interactive digital information) to devices that enter into or near the geo-fenced area. For example, an advertiser may employ the mutable geo-fence system to configure a geo-fence managed by the mutable geo-fence system to deliver customized media content to devices that enter into a particular geo-fenced area.

For purposes of this disclosure, the mutable geo-fence system may be or include any instrumentality or aggregate of instrumentalities operable to compute, process, store, display, generate, communicate, or apply various forms of data for geo-fencing, control, or other purposes. For example, the mutable geo-fence system may be or include a group of one or more server machines configured to request and receive geo-location data that defines one or more locations of interest, monitor the geo-fenced areas encompassed by the geo-fence (e.g., monitoring locations of devices relative to the geo-fence), and adjust a boundary of the geo-fence based on one or more boundary variables. The boundary variables may include a size and shape of the geo-fence, a distribution of devices within the geo-fence, as well as usage metrics of the geo-fence itself. A location of interest may include one or more real-world locations and events, such as, retail locations, concerts, parties, community events, as well as public locations.

The geo-location data may include a set of coordinates that define a point (e.g., longitude, latitude, and altitude), a polygon or free-form shape that encompasses a region in a map image corresponding to a real-world location, as well as satellite and image data. The mutable geo-fence system generates a geo-fence with a boundary that encompasses a region defined by the geo-location data received. For example, the geo-location data may include coordinates, or an address, of a retail location, and in response to receiving the coordinates, the mutable geo-fence system generates a geo-fence having a radius and boundary that encompasses the retail location. The geo-fence may be circular (e.g., a radius distance and a point defined by latitude and longitude), or a polygon, based on the geo-location data received.

Having generated the geo-fence, the mutable geo-fence system provides access to media content associated with the location of interest encompassed by the boundary of the geo-fence to devices that cross into the geo-fenced area. The media content may include digital images, audio, video and image or media overlays, that a user of a device located within the boundary of the geo-fence may access or append to digital messages (e.g., SMS, email, ephemeral messages). For example, the media content may include visual content, audio content and image or media overlays associated with the location of interest. While the device is located within the geo-fenced area, a user of the device may transmit an ephemeral message that includes the media overlay (e.g., an interactive filter) associated with the location of interest.

The ephemeral message transmitted by the device may be a text, an image, a video, and the like. The access time for the ephemeral message may be set by the message sender. Alternatively, the access time may be a default setting or a setting specified by the recipient. Regardless of the setting technique, the message is transitory.

An image or media overlay may include audio and visual content and visual effects that may be applied to an image captured or provided by a user of a device. Examples of audio and visual content include pictures, texts, logos, animations, and sound effects. An example of a visual effect includes color overlaying. The audio and visual content or the visual effects can be applied to a media content item (e.g., a photo) at a client device. For example, the media overlay including text that can be overlaid on top of a photograph generated taken by the client device. In another example, the media overlay includes an identification of a location overlay (e.g., Venice Beach), a name of a live event, or a name of a merchant overlay (e.g., Beach Coffee House).

The mutable geo-fence system determines a distribution of devices that access the media content associated with the location of interest within the geo-fenced area. In some example embodiments, to determine the distribution, the mutable geo-fence system divides the geo-fenced area into a grid that comprises a set of cells, where each cell represents portions (in some instances the portions are equal) of the physical location within the geo-fenced area, and wherein the set of cells sum to make up the whole physical location encompassed by the geo-fence. The mutable geo-fence system may track and monitor the set of cells to calculate a usage metric of each cell. The usage metric of a cell among the set of cells may be calculated based on: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time.

Based on the usage metrics of each cell among the set of cells, the mutable geo-fence system adjusts the boundary of the geo-fence to more accurately encompass the location of interest. For example, the mutable geo-fence system may adjust the boundary to exclude cells among the set of cells that have a usage metric below a predefined threshold value, and to include cells that have a usage metric above the predefined threshold value. In some example embodiments, the mutable geo-fence system may expand the boundary of the geo-fence when the usage metric of cells along a perimeter of the geo-fence are above a threshold value. The threshold value may be calculated based on historical, or average usage metrics associated with the geo-fenced area.

In some example embodiments, the geo-fences generated by the mutable geo-fence system are available to advertisers to deliver content (e.g., a campaign) to devices that cross into the geo-fenced area. For example, the mutable geo-fence system may calculate a value (e.g., price) of the geo-fenced area (or of a cell of the geo-fenced area) based on predicted usage metrics. The predicted usage metrics of the geo-fenced area may be based on: the calculated usage metrics of the set of cells (e.g., as discussed above); a size of the geo-fenced area; a duration of time in which the advertiser wants to use the geo-fence (e.g., one hour, one day, one week); a time period in which the advertiser wants to use the campaign (e.g., March, Saturdays, 2:00 pm-5:00 pm, etc.); as well as information indicating upcoming events (e.g., through a third party API accessed by the mutable geo-fence system).

The mutable geo-fence system may receive campaign information from an advertiser, such as a location of interest to administer the campaign, a duration and time of the campaign, campaign content (e.g., media content), as well as demographics information associated with desired recipients of the campaign. Based on the campaign information and the predicted usage metrics of the corresponding geo-fence, the mutable geo-fence system calculates a value of the geo-fenced area. In some example embodiments, the value is updated in real-time, as the mutable geo-fence system received the campaign information.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1. represents a set of executable software instructions and the corresponding hardware (e.g., memory and processor) for executing the instructions. To avoid obscuring the inventive subject matter with unnecessary detail, various functional components and engines that are not germane to conveying an understanding of the inventive subject matter have been omitted from FIG. 1. Additional functional components and engines may be used with a social messaging system, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface components (e.g., a web server) 140, which receive requests from various client-computing devices and servers, such as client devices 110 executing client applications 112, a mutable geo-fencing system 160, and messaging client applications 170, and third party servers 120 executing third party applications 122. In response to received requests, the interface components 140 communicate appropriate responses to requesting devices via a network 104. For example, the interface components 140 can receive requests such as Hypertext Transfer Protocol (HTTP) requests or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™ ANDROID™, WINDOWS® PHONE). In an example, the client devices 110 are executing the client applications 112. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. Users 106 can include a person, a machine, or other means of interacting with the client devices 110. In some embodiments, the users 106 interact with the social messaging system 130 via the client devices 110.

As shown in FIG. 1, the data layer 128 has one or more database servers 132 that facilitate access to information storage repositories or databases 134. The databases 134 are storage devices that store data such as sets of images of external areas generated by client devices 110 and sent to social messaging system 130; sets of façade data generated from images including buildings; map data matching images and façade data to geolocations; and other such data. In one embodiment, a database stores images captured from a street and associates those images with map data. Some implementations of such an embodiment may use filters or image cropping to remove people from the images, such as an embodiment that only stores image data above a height that includes people. Databases 134 may also store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130, including aspects of the mutable geo-fence system 160. For instance, a social messaging application can be implemented with one or more of the application logic components 150. The social messaging application provides a messaging mechanism for users of the client devices 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server component(s) 150.

Figure 2:
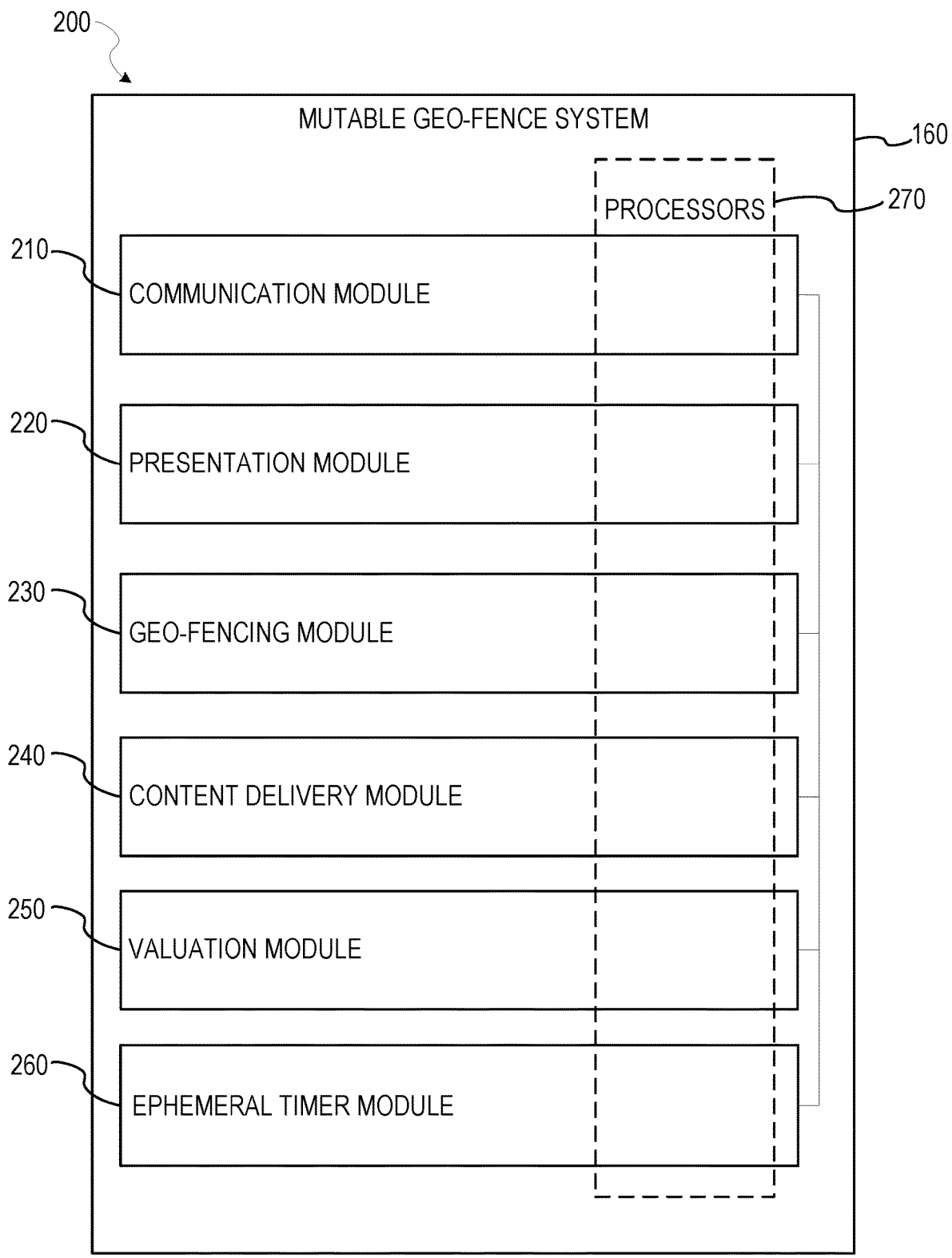
FIG. 2 is block diagram illustrating various components of a mutable geo-fence system, according to example embodiments.

FIG. 2 is a block diagram illustrating components of the mutable geo-fence system 160 that configure the mutable geo-fence system 160 to receive geo-location data to generate and manage a mutable geo-fence, according to some example embodiments. The mutable geo-fence system 160 is shown as including a communication component 210, a presentation component 220, a geo-fencing component 230, a content delivery component 240, a valuation component 250, and an ephemeral timer module 260, all configured to communicate with each other (e.g., via a bus, shared memory, or a switch). Any one or more of these components may be implemented using one or more processors 270 (e.g., by configuring such one or more processors to perform functions described for that component) and hence may include one or more of the processors 270.

Figure 3:
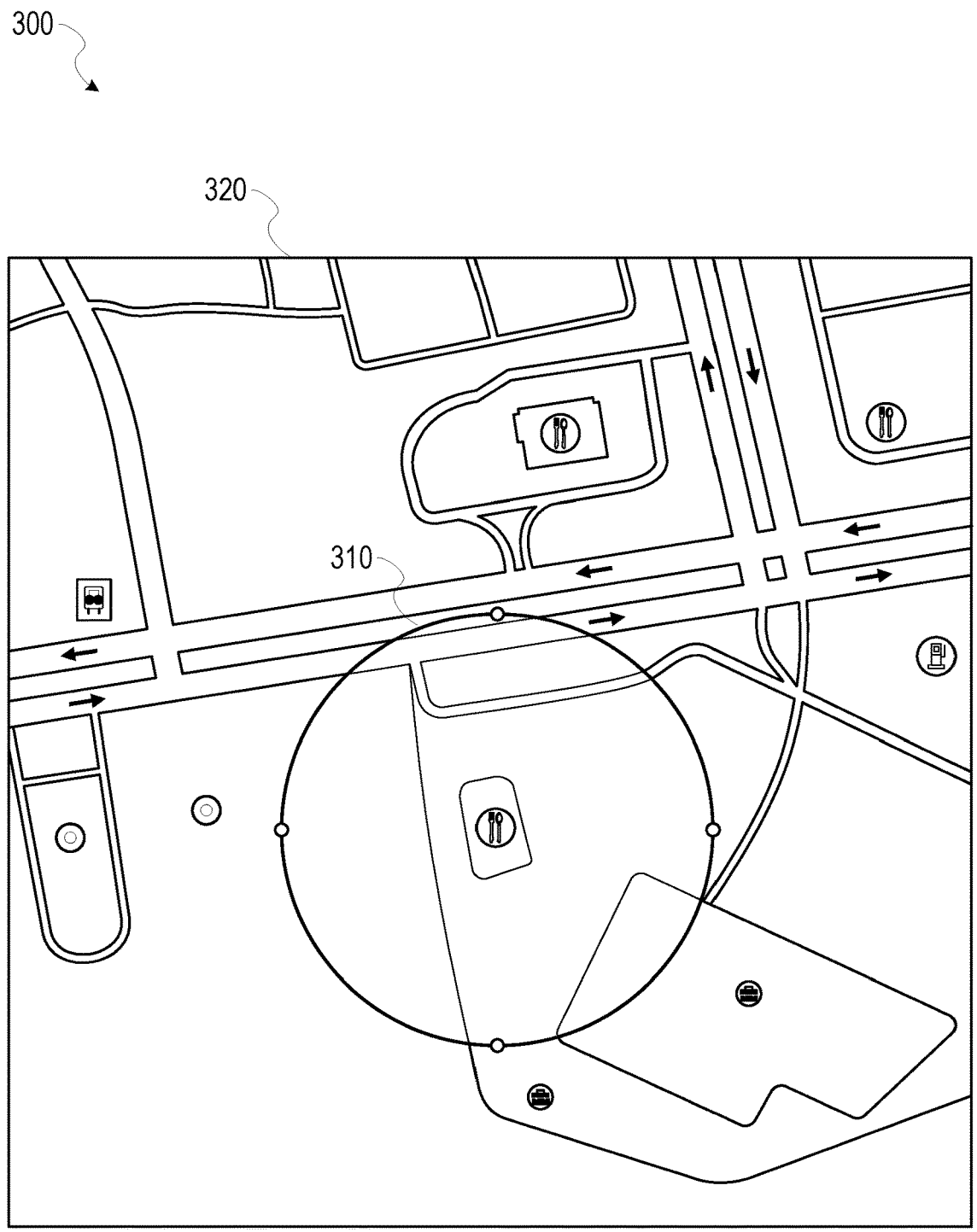
FIG. 3 is a diagram illustrating a geo-fence generated by a mutable geo-fence system, according to example embodiments.

FIG. 3 is a diagram 300 illustrating a geo-fence 310 generated by the mutable geo-fence system 160, according to example embodiments. As discussed above, the geo-fence 310 may comprise a boundary that encompasses a geographic region in a map image 320, wherein the map image 320 represents a real-world geographic region.

To generate the geo-fence 310, the communication module 210 may receive geo-location data that defines a location of interest. For example, a user 106 may provide a user input selecting a particular location of interest through a user interface displayed at a client device 110. The user input may include a selection of a point in the map image 320, or the selection of a search result from among a set of search results, wherein the search results corresponds to a location on the map image 320. The geo-fence module 230 generates the geo-fence 310, wherein a size and a location of the geo-fence 310 is based on the geo-location data.

Figure 4:
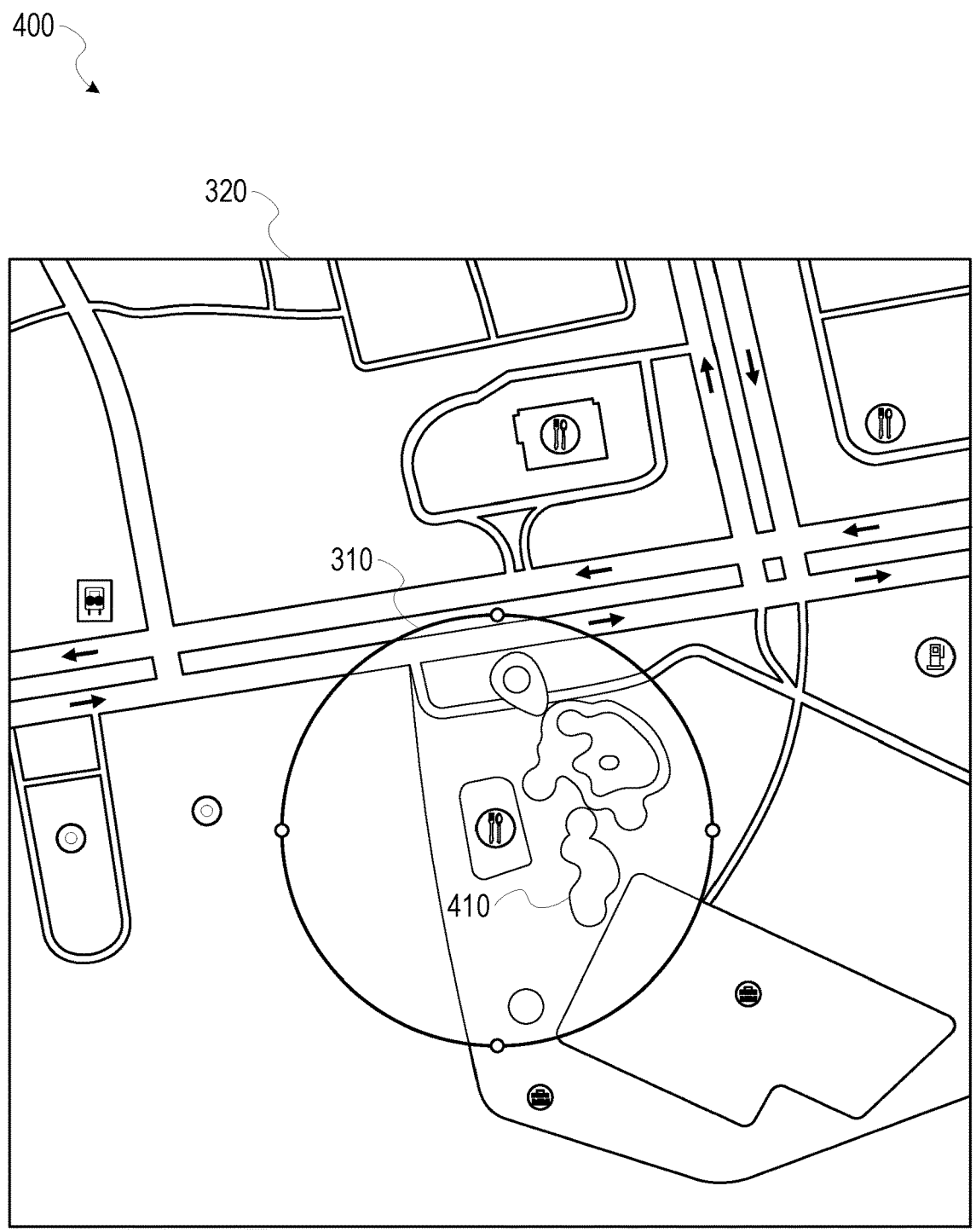
FIG. 4 is a diagram illustrating a distribution of devices within a geo-fenced area, as determined by a mutable geo-fence system, according to example embodiments.

FIG. 4 is a diagram 400 illustrating a distribution of devices 410 located within a geo-fence 310, within the map image 320, as determined by the mutable geo-fence system 160, according to example embodiments. The distribution of devices 410 may be defined as a physical density of devices within the geo-fence 310. For example, the distribution of device 410 may indicate specification physical locations of devices within the geo-fence 310.

The communication module 210 may monitor usage data of devices located within, or near, the geo-fence 310. The usage data may, for example, include: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time. Based on the usage data, the geo-fence module 230 may determine the distribution of devices 410.

The usage metric of a cell among the set of cells may be calculated based on: a number of messages transmitted from devices within the cell that include the media content over a predefined period of time; a frequency in which messages that include the media content are transmitted from the cell over a predefined period of time; as well as a number of devices that access (e.g., view or receive) the media content while within the cell over a predefined period of time.

Figure 5:
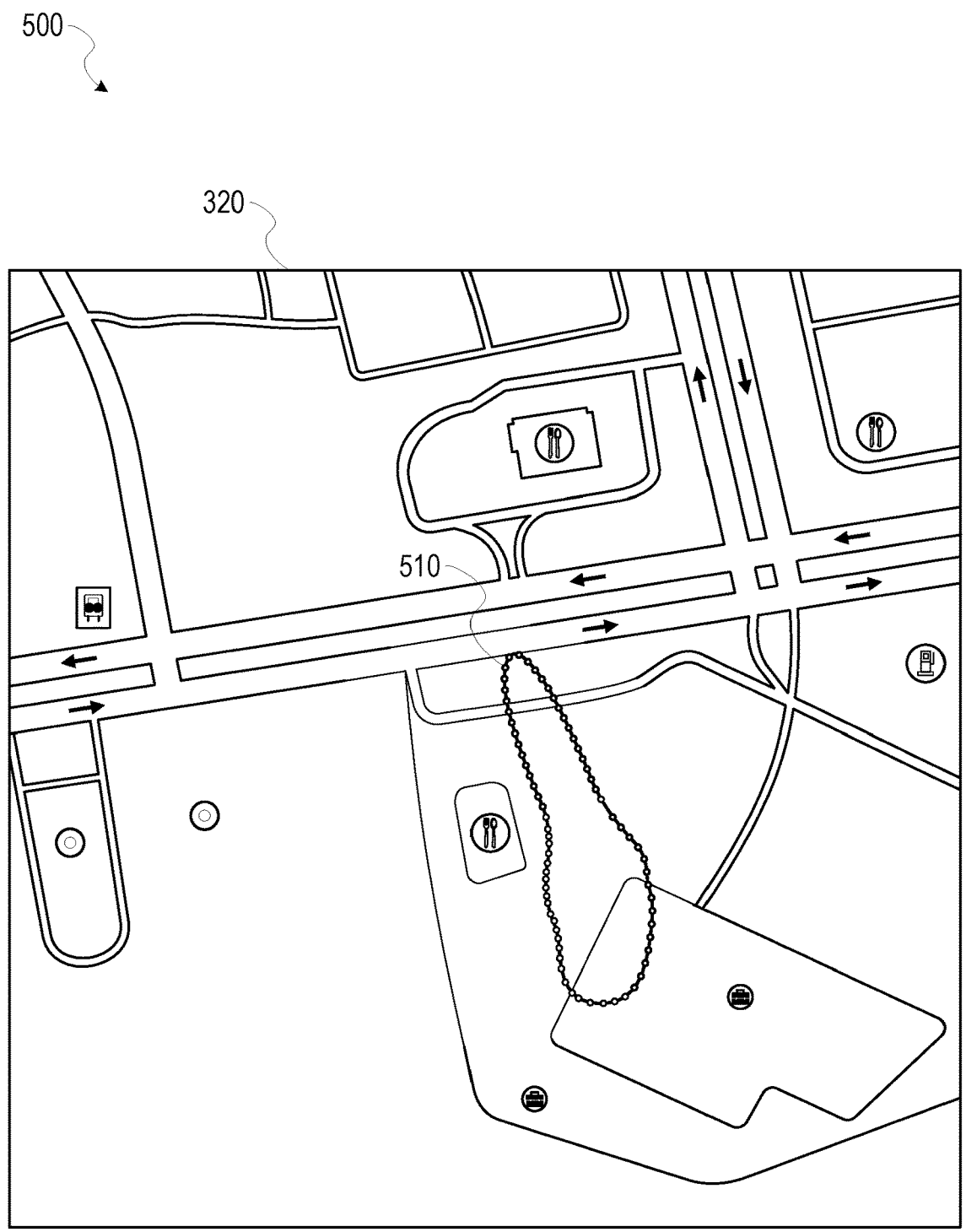
FIG. 5 is a diagram illustrating a boundary of a geo-fence, adjusted by a mutable geo-fence system, according to example embodiments.

FIG. 5 is a diagram 500 illustrating a boundary 510 of the geo-fence 310 of FIGS. 3 and 4, adjusted by the mutable geo-fence system 160, based on the distribution of devices 410, according to example method discussed herein. The geo-fence module 230 may receive the usage data to determine the distribution of devices 410, and in response, adjust the boundary of the geo-fence 310 to more accurately target devices within the geo-fences area. Although FIG. 5 depicts one enclosure formed by the mutated geo-fence, in other example embodiments, the geo-fence module 230 adjust the boundary of the geo-fence 310 such that there are multiple independent geo-fence.

Figure 6:
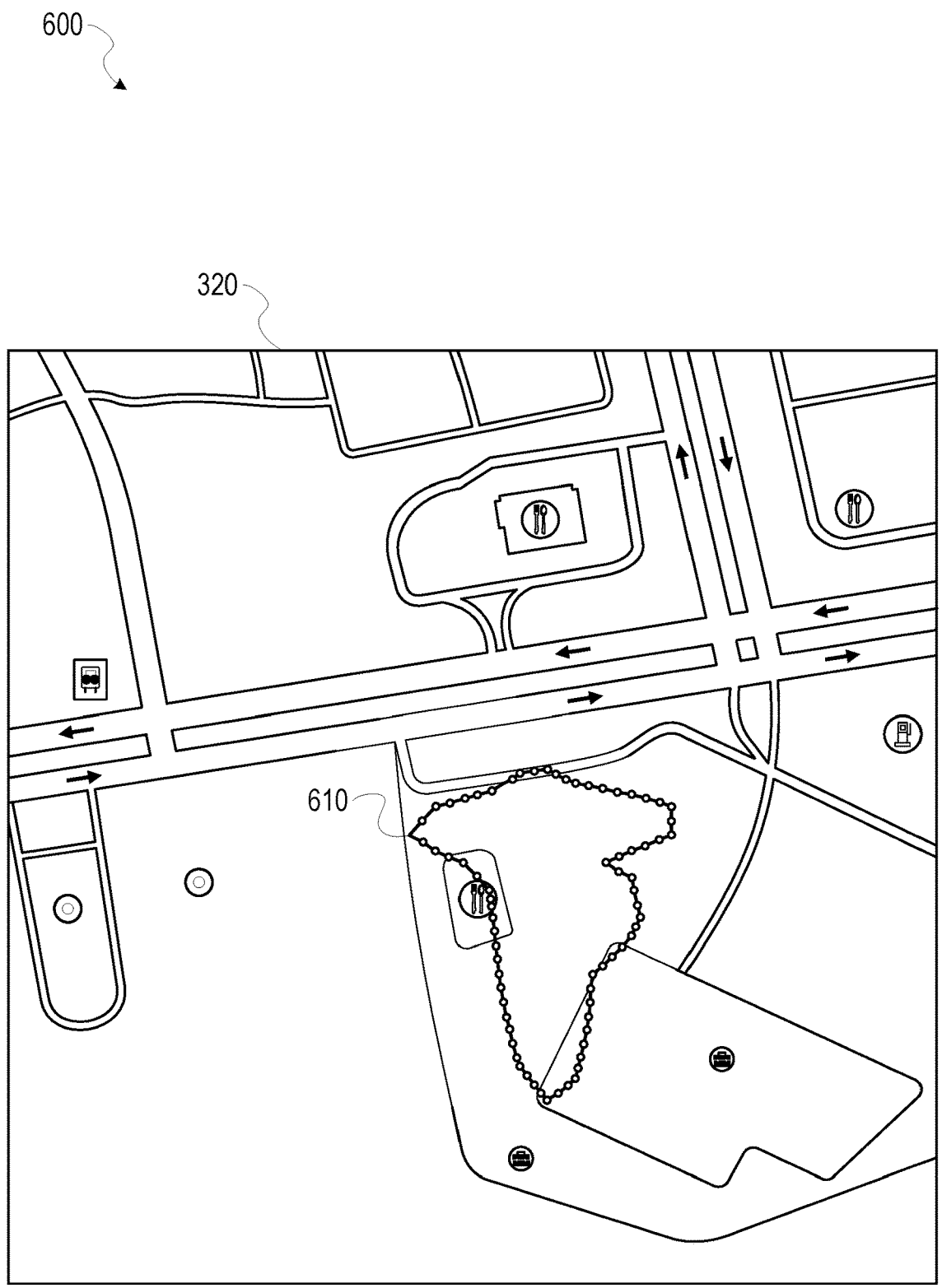
FIG. 6 is a diagram illustrating a boundary of a geo-fence, adjusted by a mutable geo-fence system, according to example embodiments.

FIG. 6 is a diagram 600 illustrating a boundary 610 of the geo-fence 310, adjusted by the mutable geo-fence system 160, according to example methods discussed herein. In some example embodiments, the geo-fence module 230 may adjust a boundary of the geo-fence 310, based on usage data collected in real-time. For example, as the communication module 210 collects usage data, the geo-fence module 230 may recalculate a distribution of devices within the geo-fenced area, and adjust the boundary 610 of the geo-fence in real-time.

In some example embodiments, the geo-fence module 230 may vary the boundary 610 of the geo-fence based on time of day. For example, the geo-fence module 230 may maintain the boundary 510 of FIG. 5 for a first period of time, and then maintain the boundary 610 for a second period of time. In some example embodiments, the periods of time may be determined based on the usage data collected by the communication module 210. Although FIGS. 3, 4, 5, and 6 depict two-dimensional geo-fences, the techniques described in this specification can be applied to three-dimensional space with geo-fences defined in three dimensions (e.g., different media content is available at the base of the Empire State Building than at the observation deck).

Figure 7:
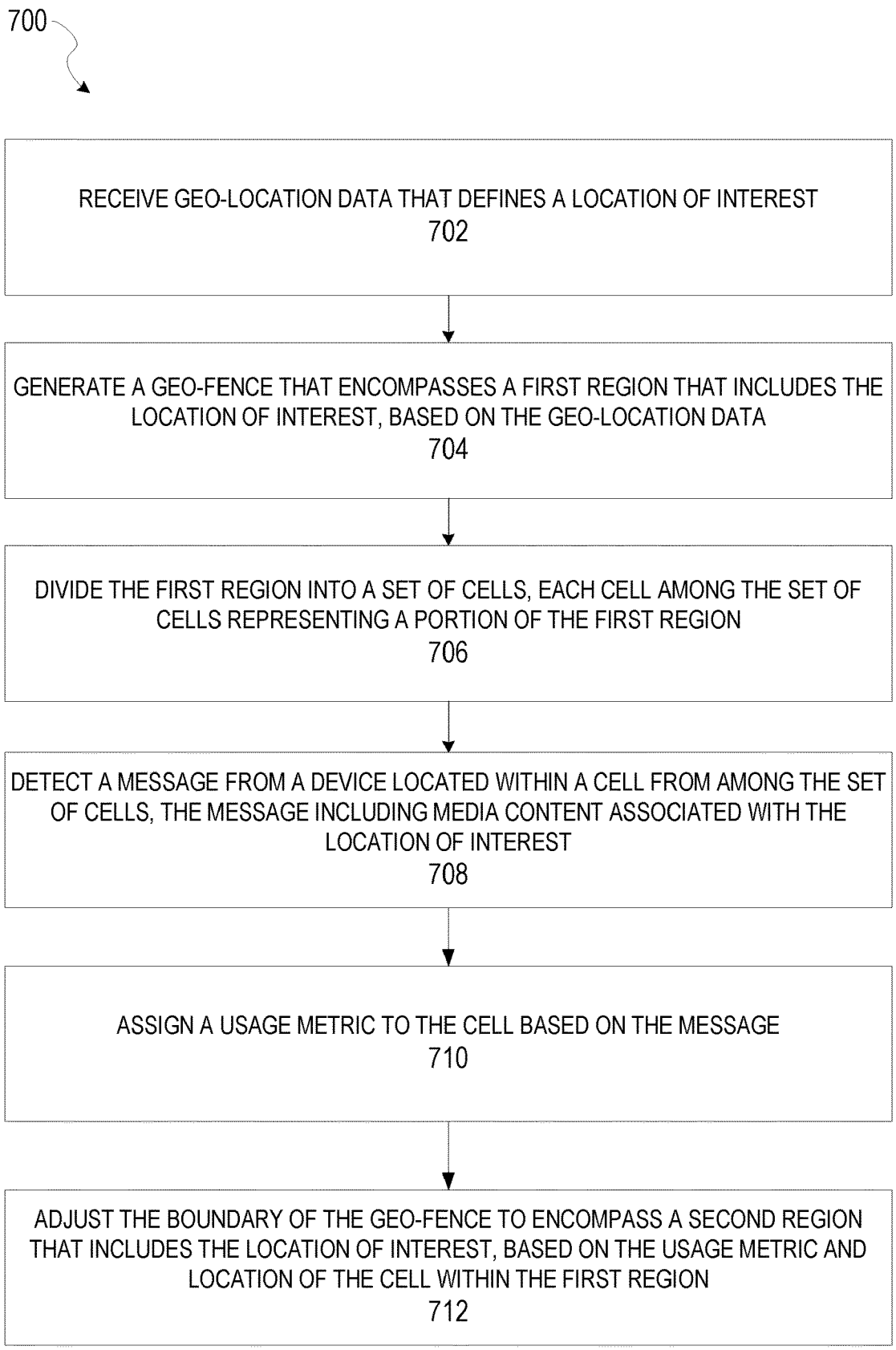
FIG. 7 is a flow diagram illustrating an example method for adjusting a boundary of a geo-fence, according to example embodiments.

FIG. 7 is a flow diagram illustrating operations of the mutable geo-fence system 160 in performing an example method 700 for adjusting a boundary of a geo-fence, according to example embodiments. As shown in FIG. 7, one or more operations 702, 704, 706, 708, 710, and 712 may be performed as part (e.g., a precursor task, a subroutine, or a portion) of the method 700, according to some example embodiments.

Operation 702 may be performed by the communication module 210. At operation 702, the communication module 210 receives geo-location data indicating a location of interest. As discussed above with respect to FIG. 3, a user 106 may provide user inputs identifying or otherwise selecting a particular location of interest through a user interface displayed at a client device 110. The user input may include a selection of a point in the map image 320, or the selection of a search result from among a set of search results, wherein the search results corresponds to a location on the map image 320. The geo-fence module 230 generates the geo-fence 310, wherein a size and a location of the geo-fence 310 is based on the geo-location data.

Operation 704 may be performed by the geo-fence module 230. At operation 704, the geo-fence module 230 generates a geo-fence that encompasses a first region that includes the region of interest, based on the geo-location data received by the communication module 210. The geo-fence generated by the geo-fence module 230 may have a corresponding size and location based on the geo-location data.

The geo-fence generated by the geo-fence module 230 may initially be over-inclusive, to capture a large region that encompasses the region of interest identified by the geo-location data. The geo-fence may be a radius around a point (e.g., the location of interest), or a set of otherwise-defined boundaries.

Operation 706 may be performed by the geo-fence module 230. At operation 706, the geo-fence module 230 divides the region encompassed by the geo-fence into a set of cells (e.g., a grid), wherein each cell among the set of cells represents a portion of the region within the geo-fence. For example, the number of cells within the region may be defined based on a size of the geo-fence, or based on user input.

Operation 708 may be performed by the communication module 210. At operation 708, the communication module 210 collects usage data from devices located within the geo-fenced area. The usage data may include corresponding geo-location data indicating a cell from among the set of cells in which the usage data originated (i.e., indicating a location of a device within the geo-fenced area). The communication module 210 may identify usage data associated with the location of interest, from among the usage data collected. For example, the communication module 210 may identify the usage data associated with the location of interest based on the message including media content associated with the location of interest encompassed by the geo-fence. For example, the usage data may include a message from a first client device located within a cell within the location of interest, wherein the message includes media content identifying the location of interest (e.g., a photo, a filter).

Operation 710 may be performed by the geo-fence module 230. At operation 710 the geo-fence module 220 calculates a usage metric based on the usage data associated with the location of interest. The usage data may for example include: a number of messages transmitted from devices within the cell that include the media content over a pre-defined period of time; a frequency in which messages that include the media content are transmitted from the cell over a predefined period of time; as well as a number of devices that access (e.g., view or receive) the media content while within the cell over a predefined period of time. Based on the usage data, and geo-location data indicating a cell in which a source device of the usage data is located within the geo-fence, the geo-fence module 230 may determine a distribution of devices within the geo-fenced area.

Operation 710 may be performed by the geo-fence module 230. Based on the usage data, the geo-fence module 230 calculates and assigns a usage metric to each cell among the set of cells within the region encompassed by the geo-fence. At operation 712, the geo-fence module 230 adjusts a boundary of the geo-fence based on the usage metrics of each cell among the set of cells. In some example embodiments, the geo-fence module 230 adjusts the boundary of the geo-fence based on a constraint. For example, the geo-fence module 230 may adjust the geo-fence such that it does not extend outside of the first region or extends a predetermined distance outside of the first region to prevent unintended drifting or shifts in the mutated geo-fence over time.

FIG. 8 is a flow diagram illustrating operations of the mutable geo-fence system 160 in performing an example method 800 for calculating a value of a geo-fenced area, according to example embodiments. As shown in FIG. 8, one or more operations 802, 804, 806, and 808 may be performed as part (e.g., a precursor task, a subroutine, or a portion) of the method 800, according to some example embodiments.

Operation 802 may be performed by the geo-fence module 230. At operation 802, the geo-fence module 230 calculates a usage metric of a geo-fence based on at least the usage metric of one or more cells within the geo-fence and the size and shape of the geo-fence.

For example, as discussed above with respect to FIG. 7, the communication module 210 collects usage data from devices located within the one or more cells comprising and within the geo-fence. The usage data may for example include: a number of messages transmitted from devices within the cell that include the media content over a predefined period of time; a frequency in which messages that include the media content are transmitted from the cell over a predefined period of time; access requests for media content; the type of media content being access by devices within the geo-fence and/or each cell of the geo-fence; as well as a number of devices that access (e.g., view or receive) the media content while within the cell over a predefined period of time. The geo-fence module 230 calculates a predicted usage metric of the geo-fence based on the usage data from each of the one or more cells, and the size and shape of the geo-fence.

Operation 804 may be performed by the communication module 210. At operation 210, the communication module 210 receives campaign information from a third party server 120, or a client device 110 associated with an advertiser. The campaign information may include a specification of a media content type, a duration of a campaign, as well as indications of a target audience of the campaign.

Operations 806 and 808 may be performed by the geo-fence module 230. At operation 806, the geo-fence module 230 calculates a value of the geo-fence based on the campaign information and the predicted usage metric, and at operation 808, assigns the value to the geo-fence. The value may include a fixed value over a predefined period of time (e.g., per day, per hour), or in some example embodiments may be based on a number of deliveries of media content to devices located within the geo-fence (e.g., value per 100 devices, value per device).

Figure 9:
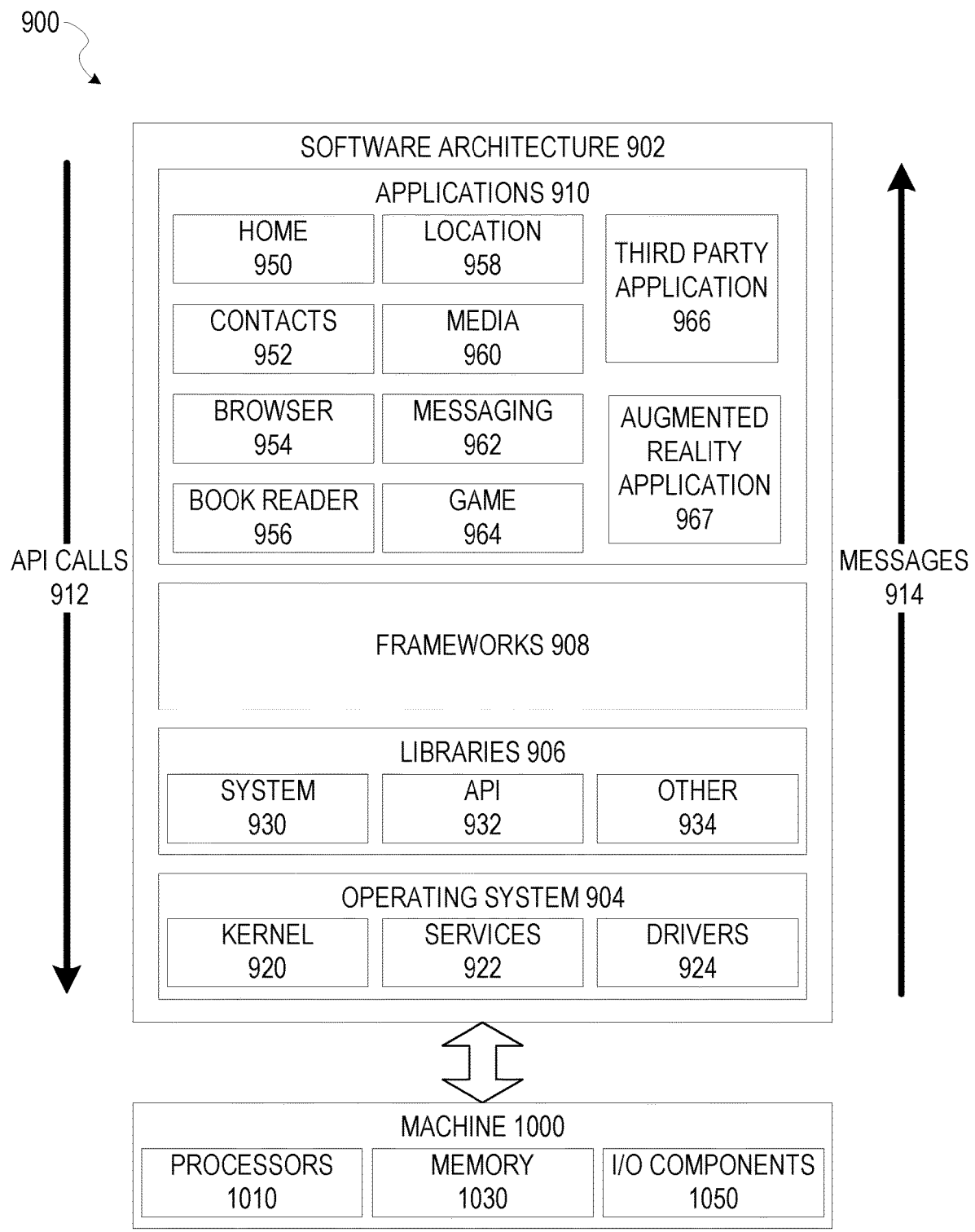
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Figure 10:
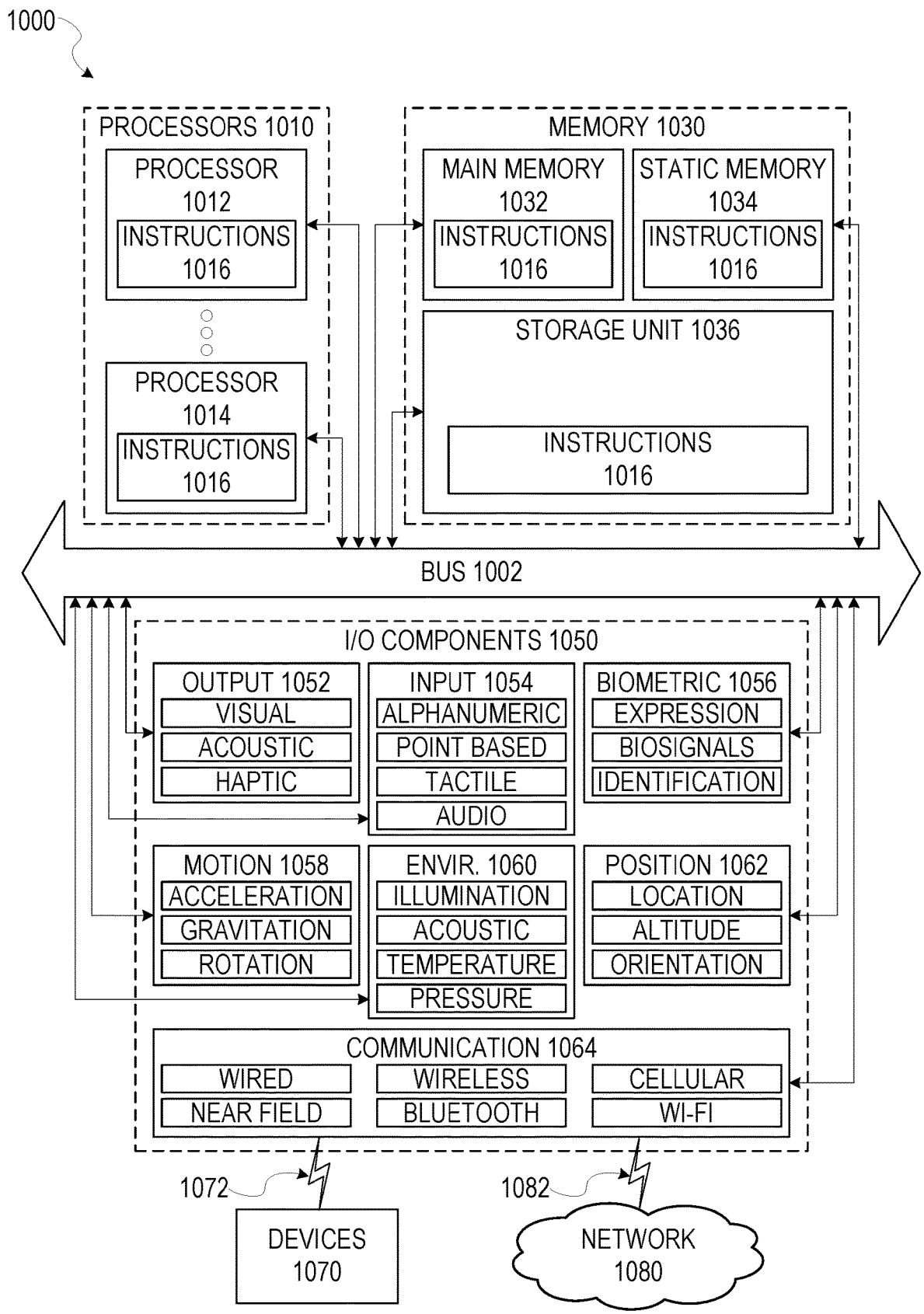
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting an BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT, INC., All Rights Reserved.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A computer-implemented method comprising:
    causing display of a presentation of a set of search results;
    receiving an input that selects a search result from among the set of search results, the search result corresponding with a location of interest;
    generating, by one or more processors, a geo-fence based on the location of interest that corresponds with the selected search result, the geo-fence comprising a boundary that encompasses a region that includes the location of interest;
    dividing the region encompassed by the geo-fence into a set of cells, each cell among the set of cells representing an equal portion of the region, wherein a quantity of the set of cells is based on a size of the geo-fence;

detecting, by one or more processors, a plurality of requests to access media content associated with the geo-fence from one or more devices located within the region encompassed by the geo-fence;

determining a distribution of a subset of the one or more devices located within a cell from among the one or more cells based on a portion of the plurality of requests to access the media content associated with the geo-fence over a predefined period of time;

calculating a usage metric of the cell based on the distribution of the subset of the one or more devices over the predefined period of time;

determining that the usage metric of the cell is below a threshold value; and adjusting the boundary of the geo-fence to exclude the cell based on the usage metric associated with the cell being below the threshold value.

2. The computer-implemented method of claim 1, further comprising:

calculating a predicted usage metric of the geo-fence based on at least the usage metric of the cell, and a size of the geo-fence;

receive campaign information that includes a duration and media content;

calculating a value of the geo-fence based on the campaign information and the predicted usage metric; and assigning the value to the geo-fence.

3. The computer-implemented method of claim 2, wherein the value of the geo-fence includes a value per period of time, wherein the period of time is determined based on the predicted usage metric.

4. The computer-implemented method of claim 2, wherein the value of the geo-fence includes a value per device that is exposed to a campaign defined by the campaign information.

5. The computer-implemented method of claim 1, wherein the media content identifies the location of interest.

6. The computer-implemented method of claim 1, wherein the media content includes image data, audio data, and video data.

7. The computer-implemented method of claim 1, wherein the message includes an ephemeral message.

8. A system comprising:

a memory; and at least one hardware processor couple to the memory and comprising instructions that cause the system to perform operations comprising:

causing display of a presentation of a set of search results;

receiving an input that selects a search result from among the set of search results, the search result corresponding with a location of interest;

generating, by one or more processors, a geo-fence based on the location of interest that corresponds with the selected search result, the geo-fence comprising a boundary that encompasses a region that includes the location of interest;

dividing the region encompassed by the geo-fence into a set of cells, each cell among the set of cells representing an equal portion of the region, wherein a quantity of the set of cells is based on a size of the geo-fence;

detecting, by one or more processors, a plurality of requests to access media content associated with the geo-fence from one or more devices located within the region encompassed by the geo-fence;

determining a distribution of a subset of the one or more devices located within a cell from among the one or more cells based on a portion of the plurality of requests to access the media content associated with the geo-fence over a predefined period of time;

calculating a usage metric of the cell based on the distribution of the subset of the one or more devices over the predefined period of time;

determining that the usage metric of the cell is below a threshold value; and adjusting the boundary of the geo-fence to exclude the cell based on the usage metric associated with the cell being below the threshold value.

9. The system of claim 8, wherein the instructions cause the system to perform operations further comprising:

calculating a predicted usage metric of the geo-fence based on at least the usage metric of the cell, and a size of the geo-fence;

receive campaign information that includes a duration and media content;

calculating a value of the geo-fence based on the campaign information and the predicted usage metric; and assigning the value to the geo-fence.

10. The system of claim 9, wherein the value of the geo-fence includes a value per period of time, wherein the period of time is determined based on the predicted usage metric.

11. The system of claim 9, wherein the value of the geo-fence includes a value per device that is exposed to a campaign defined by the campaign information.

12. The system of claim 8, wherein the media content identifies the location of interest.

13. The system of claim 8, wherein the media content includes image data, audio data, and video data.

14. The system of claim 8, wherein the message includes an ephemeral message.

15. A non-transitory machine-readable storage medium comprising instructions that, when executed by one or more processors of a machine, cause the machine to perform operations including:

causing display of a presentation of a set of search results;

receiving an input that selects a search result from among the set of search results, the search result corresponding with a location of interest;

generating, by one or more processors, a geo-fence based on the location of interest that corresponds with the selected search result, the geo-fence comprising a boundary that encompasses a region that includes the location of interest;

dividing the region encompassed by the geo-fence into a set of cells, each cell among the set of cells representing an equal portion of the region, wherein a quantity of the set of cells is based on a size of the geo-fence;

detecting, by one or more processors, a plurality of requests to access media content associated with the geo-fence from one or more devices located within the region encompassed by the geo-fence;

determining a distribution of a subset of the one or more devices located within a cell from among the one or more cells based on a portion of the plurality of requests to access the media content associated with the geo-fence over a predefined period of time;

calculating a usage metric of the cell based on the distribution of the subset of the one or more devices over the predefined period of time;

determining that the usage metric of the cell is below a threshold value; and adjusting the boundary of the geo-fence to exclude the cell based on the usage metric associated with the cell being below the threshold value.

16. The non-transitory machine-readable storage medium of claim 15, further comprising instructions that cause the machine to perform operations further comprising:
calculating a predicted usage metric of the geo-fence based on at least the usage metric of the cell, and a size of the geo-fence;
receive campaign information that includes a duration and media content;
calculating a value of the geo-fence based on the campaign information and the predicted usage metric; and
assigning the value to the geo-fence.

17. The non-transitory machine-readable storage medium of claim 16, wherein the value of the geo-fence includes a value per period of time, wherein the period of time is determined based on the predicted usage metric.

18. The non-transitory machine-readable storage medium of claim 16, wherein the value of the geo-fence includes a value per device that is exposed to a campaign defined by the campaign information.

19. The non-transitory machine-readable storage medium of claim 15, wherein the media content identifies the location of interest.

20. The non-transitory machine-readable storage medium of claim 15, wherein the media content includes image data, audio data, and video data.

\* \* \* \* \*